Dec. 6, 1955  A. J. NYGAARD  2,725,618
TRACTOR WHEEL PULLER
Filed Aug. 22, 1952  2 Sheets-Sheet 1
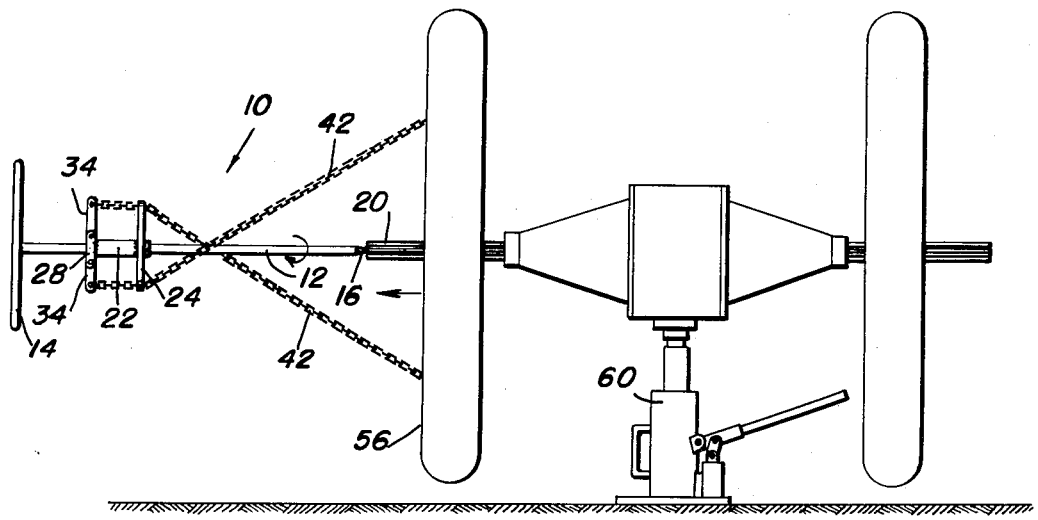
Fig. 1
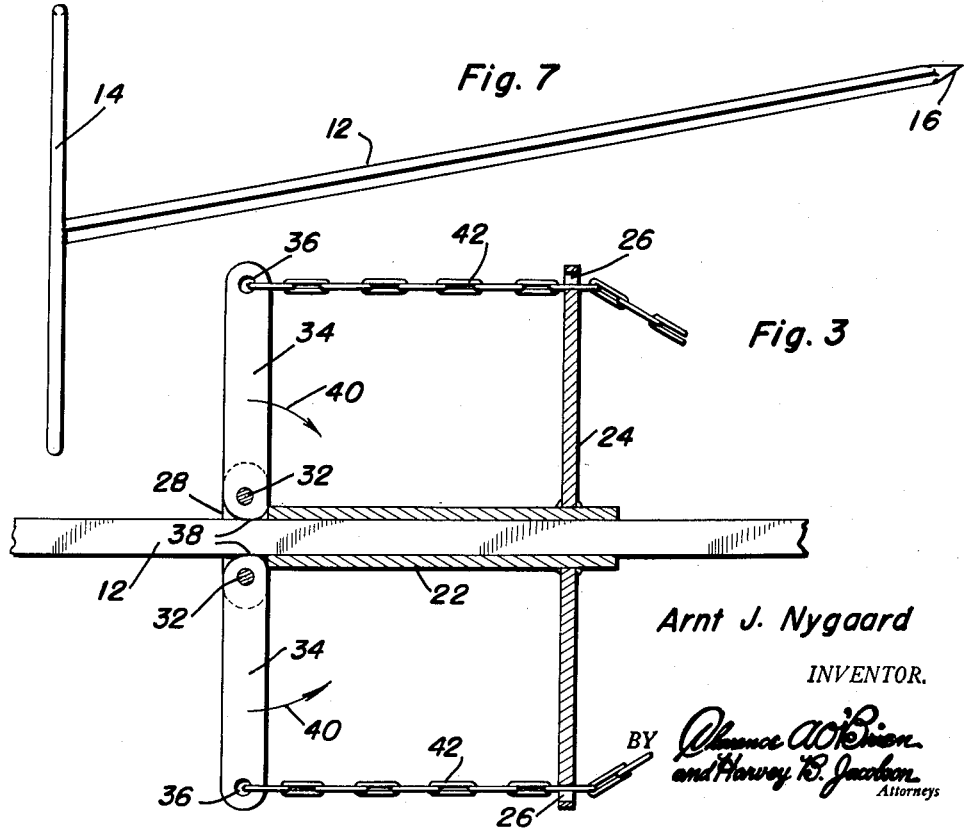
Fig. 7
Fig. 3
Arnt J. Nygaard
INVENTOR.

Dec. 6, 1955     A. J. NYGAARD     2,725,618
TRACTOR WHEEL PULLER
Filed Aug. 22, 1952     2 Sheets-Sheet 2
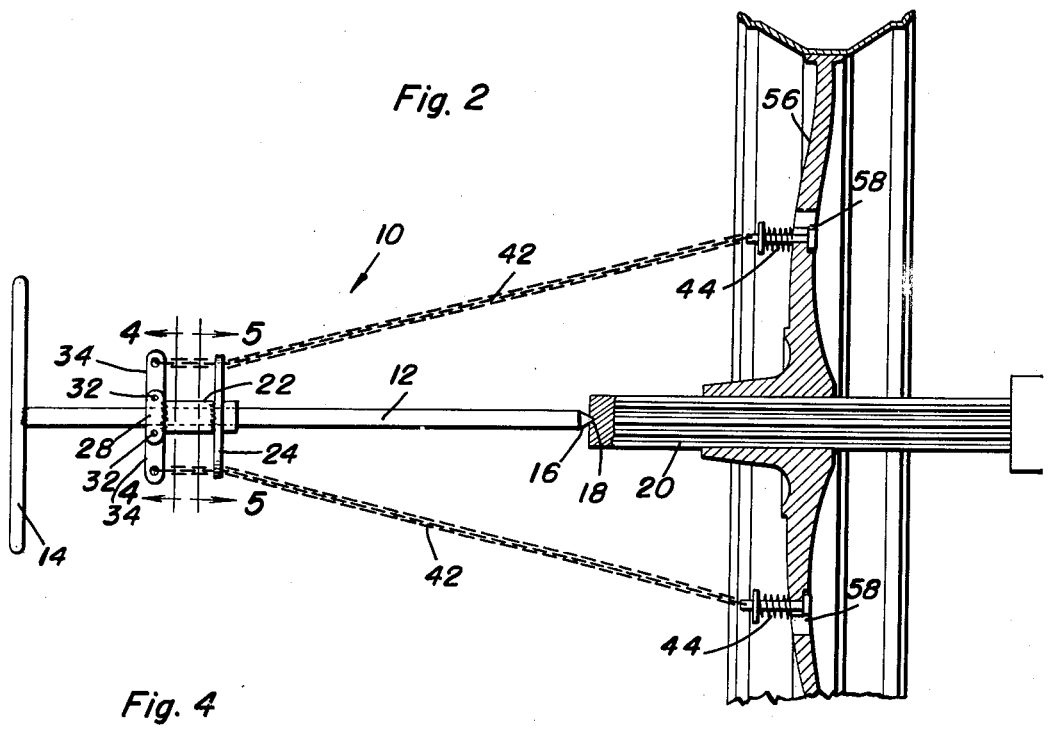
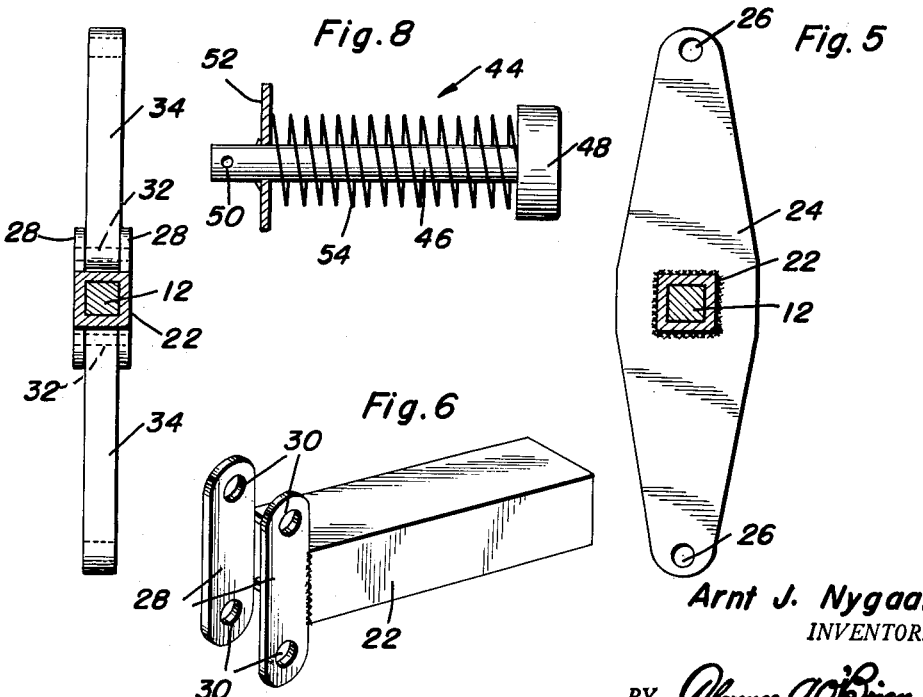
Arnt J. Nygaard
INVENTOR.

United States Patent Office 2,725,618
Patented Dec. 6, 1955

2,725,618

TRACTOR WHEEL PULLER

Arnt J. Nygaard, Astoria, S. Dak.

Application August 22, 1952, Serial No. 305,904

1 Claim. (Cl. 29—244)

This invention relates to new and useful improvements and structural refinements in pullers for tractor wheels, and the principal object of the invention is to provide means whereby tractor wheels may be quickly and easily pulled outwardly on their axle so as to effect an adjustment in the width of the tread.

Some of the advantages of the invention reside in its simplicity of construction, in its efficient and expeditious, and its adaptability for use on wheels or tractors of different sizes and types.

With the above more important objects and features in view and such other objects and features as may become apparent as this specification proceeds, the invention consists essentially of the arrangement and construction of parts as illustrated in the accompanying drawings, in which:

Figure 1 is an elevational view of the invention in use;

Figure 2 is an elevational view on an enlarged scale, showing the invention applied to the axle and wheel of a tractor, the wheel being shown in section;

Figure 3 is a fragmentary sectional detail of the spider used in the invention;

Figure 4 is a sectional view, taken substantially on the plane of the line 4—4 of Figure 2;

Figure 5 is a sectional view, taken substantially in the plane of the line 5—5 of Figure 2;

Figure 6 is a perspective view of the sleeve and ears used in the invention;

Figure 7 is a perspective view of the shaft and handle used therein; and

Figure 8 is an elevational view, partly in section, of the tractor wheel engaging means.

Like characters of reference are employed to designate like parts in the specification and throughout the several views.

Referring now to the accompanying drawings in detail, the invention consists of a tractor wheel puller which is designated generally by the reference character 10 and embodies in its construction a shaft 12 of a polygonal cross-section, one end of which is equipped with a handle 14 while its other end is pointed as at 16 to engage the usual counter-sink 18 in the end of a tractor axle 20.

An elongated sleeve 22, provided with a polygonal bore, is slidably positioned on the shaft 12 and one end portion of the sleeve has rigidly secured thereto a transverse, elongated plate 24 provided in its end portions with a pair of apertures or openings 26.

The other end of the sleeve 22 has rigidly secured thereto a pair of transversely spaced ears 28 having pairs of aligned apertures to receive a pair of pivot pins 32. The pins are disposed at the opposite sides of the shaft 12 and at right angles thereto. A pair of swingable dogs 34 are mounted on the respective pins 32, the outer ends of the dogs being equipped with apertures 36 while the inner ends of the dogs are in the nature of cams 38 which are frictionally engageable with the shaft 12 when the dogs extend substantially perpendicularly to the shaft or are swung inwardly in the direction of the arrows 40 in Figure 3.

A pair of flexible elements such as chains 42 pass freely through the apertures 26 of the plate 24 and are connected at one end thereof to the respective dogs 34 through the apertures 36, the chains 42 being equipped at their other ends with wheel engaging units 44.

One of the units 44 is clearly shown in Figure 8, from which it will be apparent that the unit consists of a stud 46 provided at one end thereof with an enlarged head 48 while its other end portion is provided with an aperture 50 for connection to the associated chain 42. The flat washer 52 is secured to the stud 46 adjacent the aperture 50 and a compression spring 54 is placed on the stud between the washer 52 and the head 48, as shown.

The tractor wheel 56 is usually provided with undercut recesses 58 with which the units 44 may be lockably engaged by simply passing the heads 48 of the studs 46 into the recesses and permitting the springs 54 to abut the front or outer face of the wheel, whereby to sustain the units 44 in position.

Thereupon, the elements 22, 24, 28, 32 and 34, which may be collectively designated as a spider, are slid along the shaft 12 in a outward direction so that the chains 42 are placed under initial tension. Rotation is then imparted to the shaft 12 and the spider thereon by turning the handle 14, and since the tractor wheel, of course, will remain stationary, rotation of the shaft 12 will twist portions of the chains 42 between the tractor wheel and the plate 24 around the shaft 12 as shown in Figure 1, so that the chains will be placed under substantial tension and will urge the dogs 34 in the direction of the arrows 40 so that the cams 38, by frictionally gripping the shaft 12, will prevent any possible sliding of the spider on the shaft. Simultaneously, a pulling force will be exerted by the chains 42 upon the tractor wheel, so that the latter will be slid outwardly on the axle 20.

Needless to say, while the operation is in progress, the rear end of the tractor should be elevated by a suitable jack 60 so that the wheel which is being pulled is free of the ground.

The purpose of the apertured plate 24, of course, is to sustain the outer end portions of the chains 42 in substantial alignment with the dogs 34 while the inner portions of the chains are being twisted around the shaft 12.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A tractor wheel puller comprising a rotatable polygonal shaft having one end adapted to abut one end of a tractor axle, a handle on the other end of the shaft for rotating the same, a polygonal sleeve fitted on the shaft for rotation thereby and sliding endwise thereon outwardly of said wheel, a pair of dogs having inner ends pivoted to one end of the sleeve at opposite sides of the shaft for swinging into perpendicular position relative to said shaft, cams on the inner ends of said dogs rotatable into friction locking engagement with said shaft by swinging of the dogs into perpendicular position whereby to lock said sleeve to said shaft against sliding and said dogs in perpendicular position, an apertured guide plate on the other end of said sleeve, and a pair of flexible elements attachable at corresponding ends thereof to said wheel at opposite sides of said axle and having the other ends thereof slidably guided through the apertured plate and attached to said dogs, said sleeve, plate and dogs forming a spider slidable outwardly of said wheel to tighten said elements and rotatable by said shaft to twist and tension said elements for maintaining said dogs in perpendicular position and exerting pull on said wheel.

References Cited in the file of this patent

UNITED STATES PATENTS

| | | |
|---|---|---|
| 673,679 | Foster et al. | May 7, 1901 |
| 1,239,875 | Bruce | Sept. 11, 1917 |
| 1,247,489 | Beachler | Nov. 20, 1917 |
| 1,866,654 | Kulp et al. | July 12, 1932 |
| 2,489,413 | Hink | Nov. 29, 1949 |
| 2,492,857 | Goranson | Dec. 27, 1949 |